(12) United States Patent
Chien et al.

(10) Patent No.: US 7,903,895 B2
(45) Date of Patent: Mar. 8, 2011

(54) DATA TRANSFORMATION DEVICE FOR IMAGE PROCESSING

(75) Inventors: Hung-Lun Chien, Taipei County (TW); De-Yu Kao, Taipei (TW)

(73) Assignee: Princeton Technology Corporation, Taipei County (TW)

( * ) Notice: Subject to any disclaimer, the term of this patent is extended or adjusted under 35 U.S.C. 154(b) by 1012 days.

(21) Appl. No.: 11/730,372

(22) Filed: Mar. 30, 2007

(65) Prior Publication Data

US 2008/0123982 A1 May 29, 2008

(30) Foreign Application Priority Data

Nov. 27, 2006 (TW) .............................. 95143711 A (51) Int. Cl.
*G06K 9/36* (2006.01)
*G06K 9/46* (2006.01)
(52) U.S. Cl. ........................................ 382/248; 382/250
(58) Field of Classification Search .................. 382/164, 382/173, 232, 233, 248, 250, 251, 254, 260, 382/266, 276, 294, 305; 358/1.14, 1.15
See application file for complete search history.

(56) References Cited

U.S. PATENT DOCUMENTS

| | | | | |
|---|---|---|---|---|
| 4,636,696 A * | 1/1987 | Minakuchi et al. | ........... | 388/809 |
| 5,361,220 A * | 11/1994 | Asano | ........................ | 708/401 |
| 5,818,973 A * | 10/1998 | Hsu | ............................. | 382/260 |
| 5,946,652 A * | 8/1999 | Heddle | ....................... | 704/230 |
| 7,471,780 B2 * | 12/2008 | Bolt et al. | ............... | 379/114.14 |
| 7,605,931 B2 * | 10/2009 | Sato et al. | ................. | 358/1.14 |
| 7,738,700 B2 * | 6/2010 | Shiiyama | ..................... | 382/170 |
| 2008/0123982 A1 * | 5/2008 | Chien et al. | ................ | 382/248 |

* cited by examiner

*Primary Examiner* — Amir Alavi
(74) *Attorney, Agent, or Firm* — Muncy, Geissler, Olds & Lowe, PLLC (57) ABSTRACT

A data transformation device including a pre-processing unit, a calculating unit and a post-processing unit is disclosed. The pre-processing unit performs a first pre-process with received image data to generate pre-processed image data, and performs a second pre-process with received result data to generate pre-processed result data. The calculating unit generates first calculated data and second calculated data according to the pre-processed image data and the pre-processed result data, by both a first calculating component and a second calculating component respectively. The post-processing unit performs a first post-process to generate the result data according to the first calculating data, and performs a second post-process to generate the image data according to the second calculating data.

8 Claims, 7 Drawing Sheets

DATA TRANSFORMATION DEVICE FOR IMAGE PROCESSING

BACKGROUND OF THE INVENTION

1. Field of the Invention

The invention relates to image processing, and more particularly relates to a data transformation device performing discrete cosine transforms and inverse discrete cosine transforms.

2. Description of the Related Art

MPEG-4 is a multimedia video data compression standard. MPEG data is supported by a wide variety of products, including, digital televisions, set-top boxes, digital satellite systems (DSS), televisions, decoders, digital versatile disk players (DVD players), video conferencing apparatuses and web cams among others. MPEG compression reduces file size, thus, less storage is required in the described devices. Moreover, the bandwidth required for transmission of video and image data is reduced.

Figure 1:
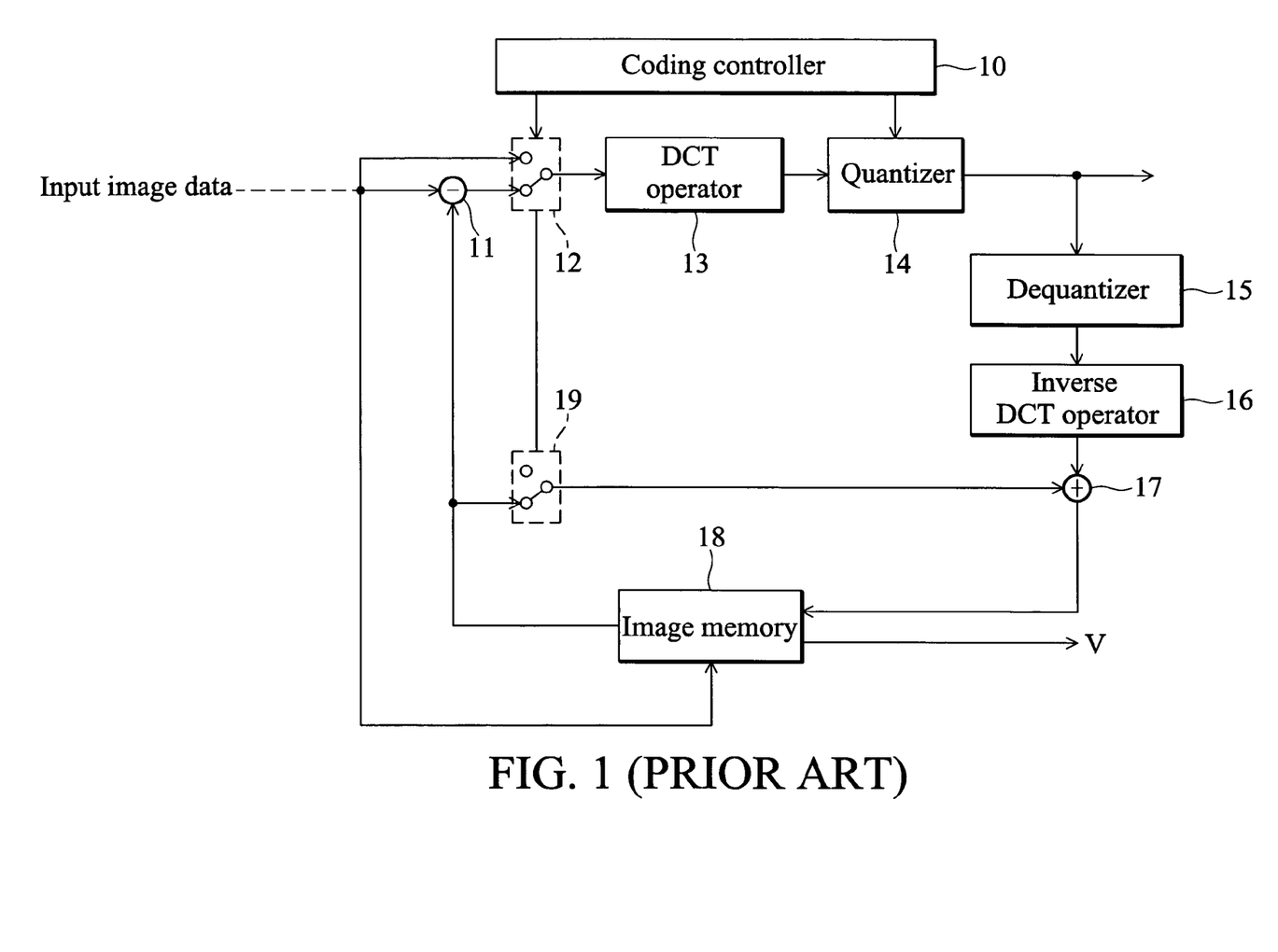
FIG. 1 is a diagram illustrating a conventional image compression device.

FIG. 1 is a diagram illustrating a conventional image compression device. The conventional image compression device comprises a discrete cosine transform operator (DCT operator) 13 and a quantizer 14. The DCT operator 13 is configured to perform discrete cosine transforms (DCT). The quantizer 14 is configured to quantize the DCT factors. The conventional image compression device provides a feedback path comprising an inverse quantizer 15, an inverse DCT operator 16, an adder 17, switching logic units 12 and 19, and a subtractor 11. The conventional image compression device is configured with an image memory 18 for extracting a motion vector V. The conventional image compression device further comprises a coding controller 10 for controlling the quantizer 14 and the switching logic units 12 and 19.

Figure 2:
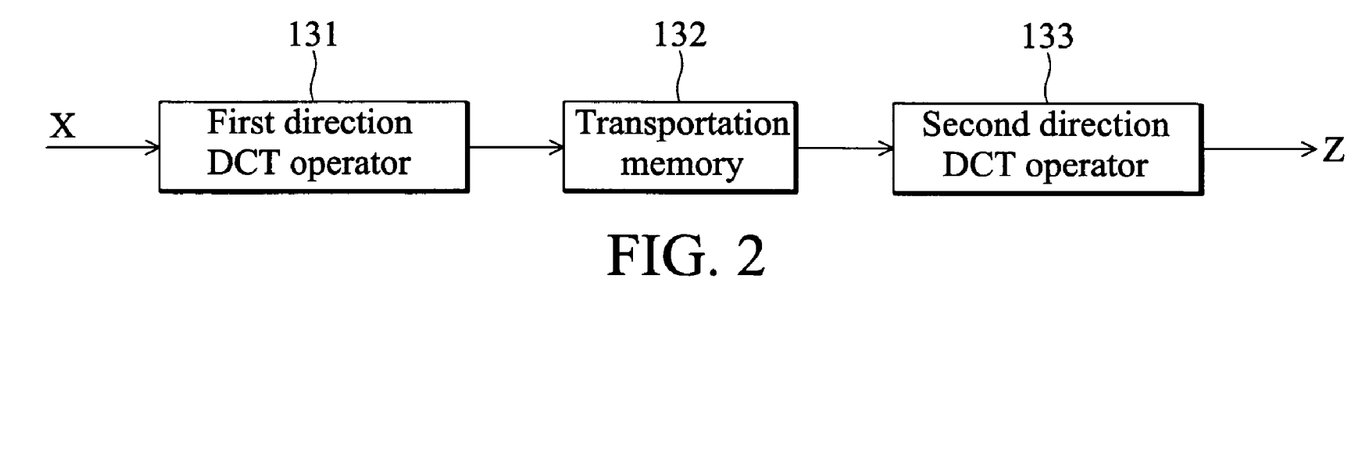
FIG. 2 is a block diagram illustrating a row-column decomposition method of the conventional DCT calculation.

The DCT operator 13 can process input image data where the image size is N×N. The DCT process of the conventional image compression device processes and transforms the data by the row-column decomposition method, as shown in FIG. 2. The number of multiplications is reduced by the row-column decomposition method with the property of the DCT kernel. The DCT operator 13 outputs the transformed N.times.N data square to the quantizer 14 subsequent to row-column decomposition.

In the row-column decomposition, the row-direction image data of the N×N image data is first provided to a first direction DCT operate 131. The first direction DCT operate 131 applies the processed row-direction image data row-column decomposition stored in a transportation memory 132. The image data processed by the first direction DCT operator 131 is read in the column-direction and provided to a second direction DCT operator 133 for processing by the second direction DCT operator 133 in the column-direction.

In the row-column decomposition of the conventional DCT calculation, the DCT factors are quantized by the quantizer subsequent to the first and the second direction DCT calculation with the N×N image block by the DCT operator. The dequantizer 15 is enabled subsequent to processing by the N×N image block. After the dequantizer 15 outputs the dequantization result, the inverse discrete cosine transform (IDCT) operator 16 starts the IDCT calculation. The DCT operator 13, the quantizer 14, the dequantizer 15, and the IDCT operator 16 operate, respectively, in the different phases.

In the conventional method, the DCT and the IDCT are applied by the DCT operator 13 and the IDCT operator 16, respectively, thus, higher occupation of a chip area results.

SUMMARY

A detailed description is given in the following embodiments with reference to the accompanying drawings.

The invention provides a data transformation device. An exemplary embodiment of a data transformation device comprises a pre-processing unit, a calculating unit and a post-processing unit. The pre-processing unit is configured to perform a first pre-process with received image data to generate pre-processed image data, and to perform a second pre-process with received result data to generate pre-processed result data. The calculating unit is configured to generate first calculating data and second calculating data according to the pre-processed image data and the pre-processed result data, respectively, by both a first calculating component and a second calculating component. The post-processing unit is configured to perform a first post-process to generate the result data according to the first calculating data, and to perform a second post-process to generate the image data according to the second calculating data.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
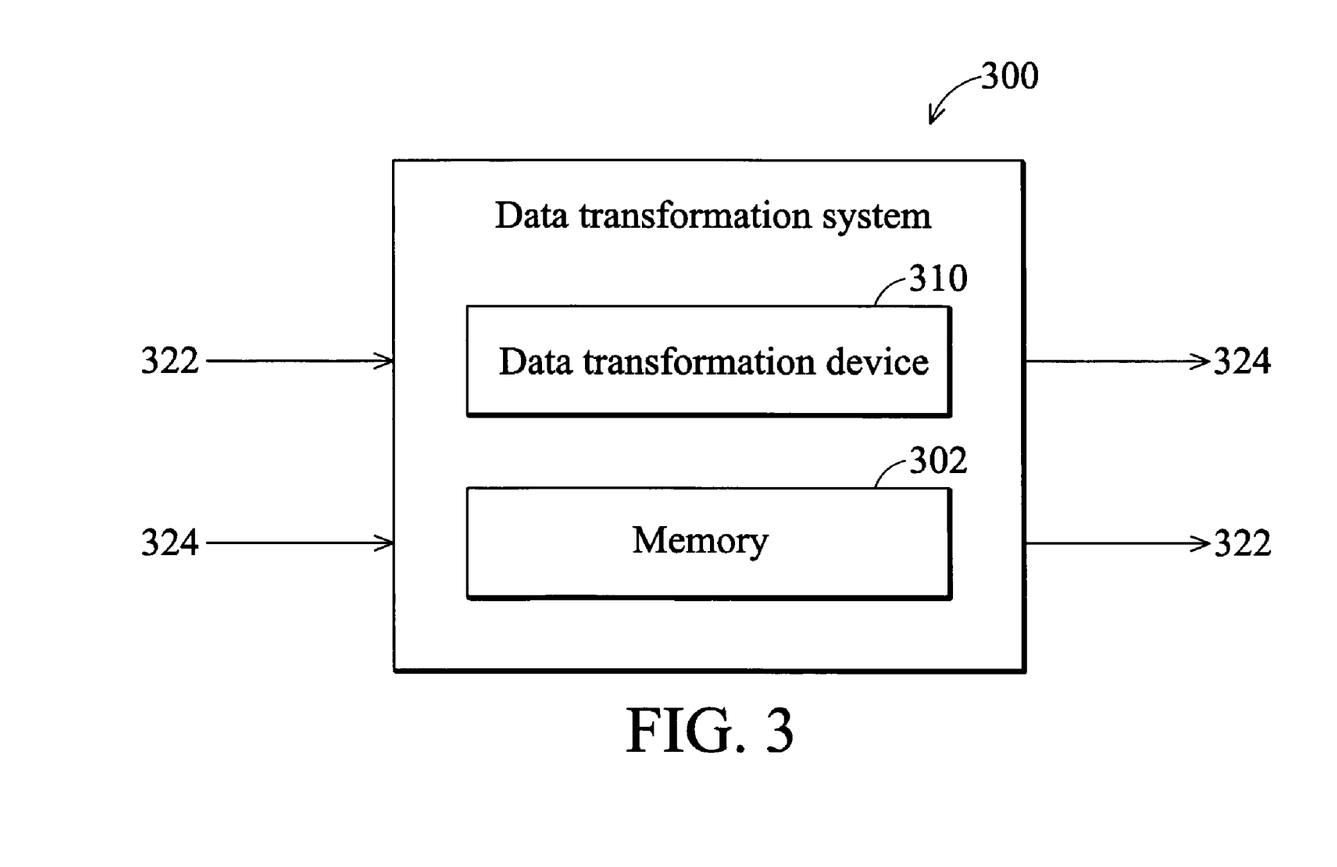
FIG. 3 is a diagram illustrating an exemplary embodiment of a data transformation system.

FIG. 3 is a diagram illustrating an exemplary embodiment of a data transformation system 300 comprising a data transformation device 310 and a memory 302.

The data transformation system 300 performs a discrete cosine transform (DCT) calculation with 2-dimensional image data 322 and then generates 2-dimensional result data 324. The data transformation system 300 also performs an inverse discrete cosine transform (IDCT) calculation with the 2-dimension result data 324 and then generates the 2-dimensional image data 322. The 2-dimensional image data 322 and 324 may be frame data or one-dimensional processing data stored in a memory.

Figure 4A:
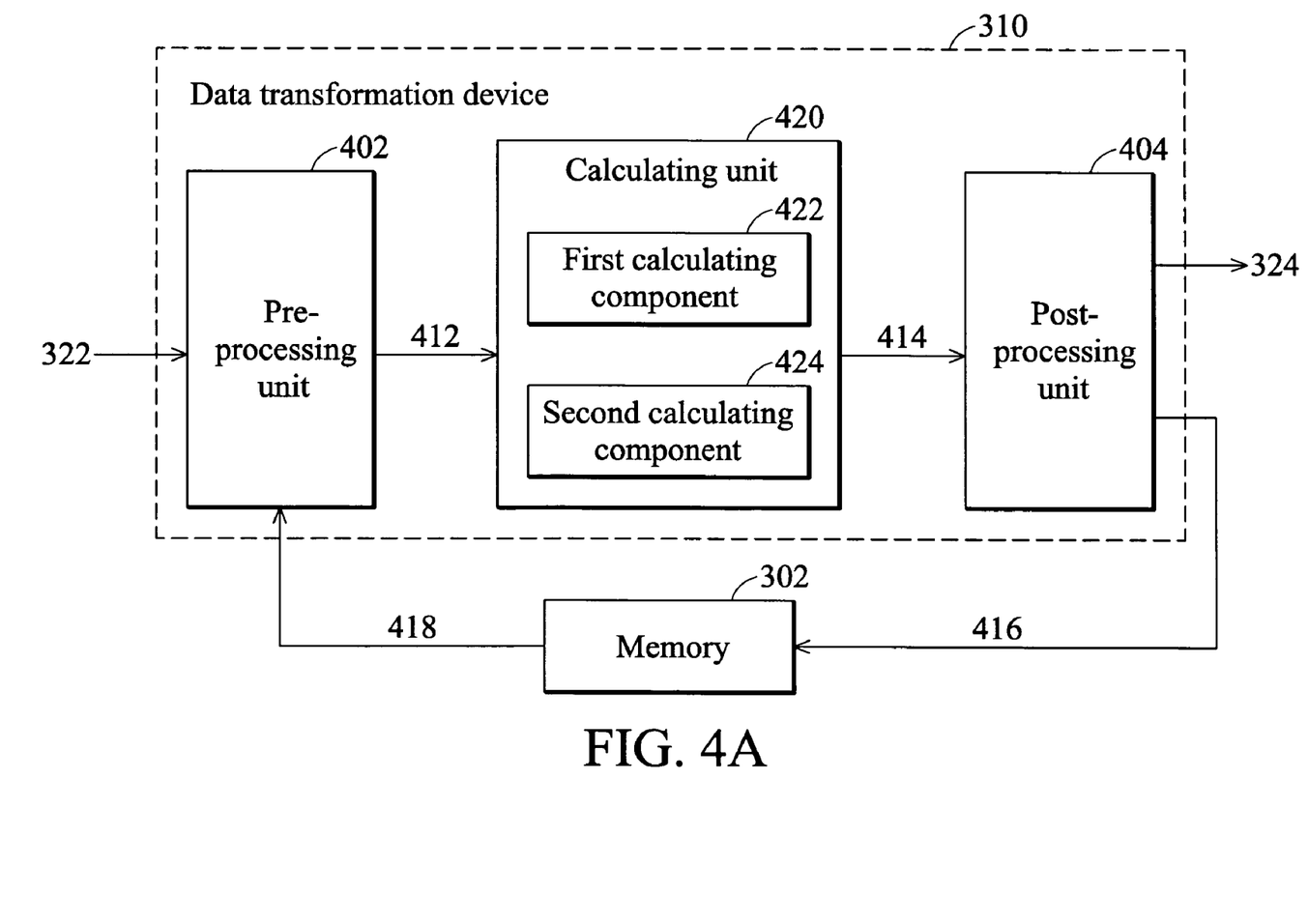
FIG. 4A is a diagram illustrating an exemplary embodiment of a data transformation device.

FIG. 4A is a detailed diagram illustrating an exemplary embodiment of the data transformation system 300. The data transformation device 310 comprises a pre-processing unit 420, a calculating unit 420 and a post-processing unit 404. The calculating unit 420 comprises a first calculating component 422 and a second calculating component 424.

DCT calculation by the data transformation system 300 is given as an example. The pre-processing unit 402 performs a first pre-process to generate pre-processed image data 412 according to each row image data in the 2-dimensional image data 322. The first pre-process may re-sort all the row image data or perform additions and subtractions with all the row image data in the 2-dimensional image data 322. The calculating unit 420 generates first calculated data 414, respectively, by both the first calculating component 422 and the second calculating component 424 according to the pre-processed image data 412. The first calculating component 422 and the second calculating component 424 are both skew circular convolution (SCC) units for performing skew circular convolution on the pre-processed image data 412. The post-processing unit 404 performs a first post-process to generate row result data 416 according to the first calculated data 414 and to apply the row result data 416 stored in the memory 302. The first post-process may perform additions and subtractions with the first calculated data 414. Further, in an exemplary embodiment of the invention, the memory 302 is a transposition random access memory (RAM).

After each row image data in the 2-dimensional image data 322 is processed by the data transformation device 310 to generate the row result data 416, column image data 418 of all the row result data 416 stored in the memory 302 are transmitted to the pre-processing unit 402.

The pre-processing unit 402 performs the first pre-process to generate the pre-processed image data 412 according to the column image data 418. The calculating unit 420 generates the first calculated data 414, respectively, by both the first calculating component 422 and the second calculating component 424 according to the pre-processed image data 412. The post-processing unit 404 performs the first post-process to generate the 2-dimensional result data 324 according to the first calculated data 414. The DCT calculation is then complete.

Figure 5:
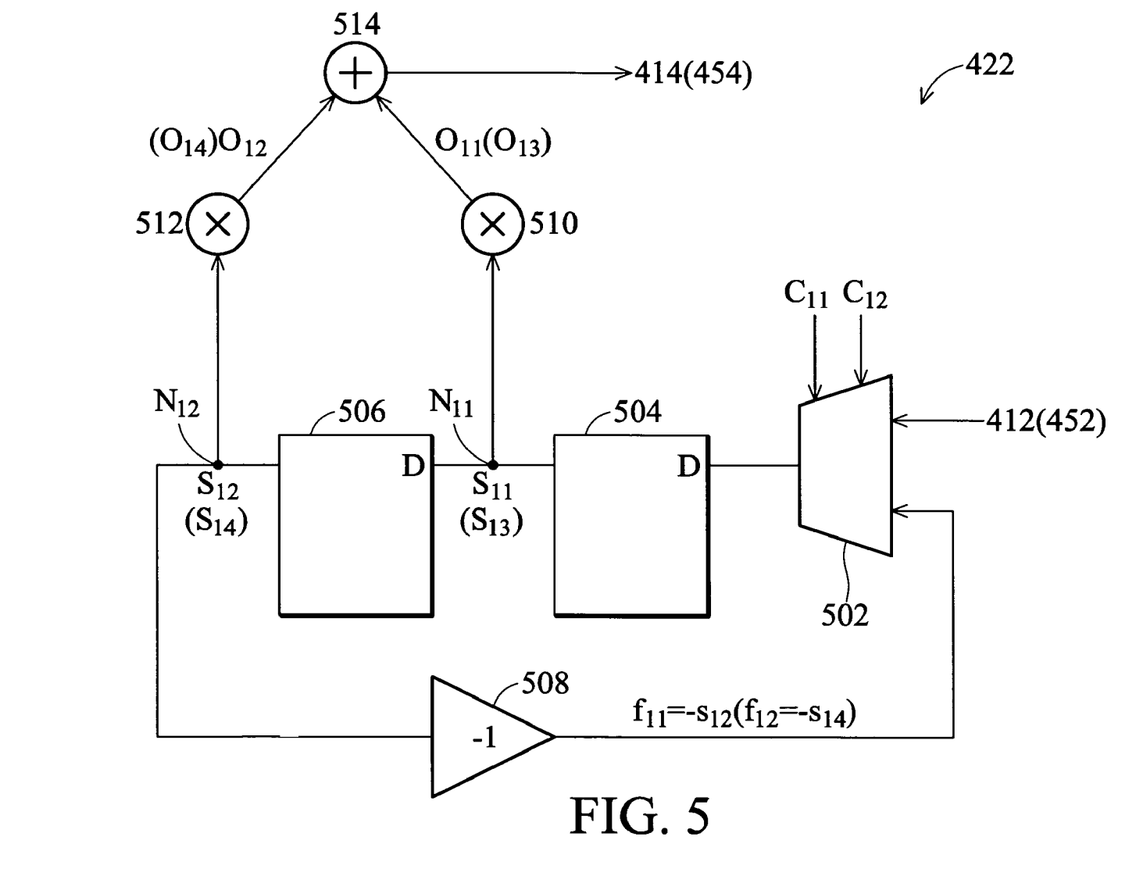
FIG. 5 is a diagram illustrating an exemplary embodiment of a first calculating component.

FIG. 5 is a diagram illustrating an exemplary embodiment of the first calculating component 422, comprising a first multiplexer 502, a first flip-flop 504, a second flip-flop 506, a first inverse unit 508, a first gain stage 510, a second gain stage 512 and a first adder 514.

While performing the DCT calculation, the first multiplexer 502 in the first calculating component 422 selects either the pre-processed image data 412 or a first feedback signal f11 for output according to a first selection signal C11 and then generates a first signal S11 and a second signal S12. The first flip-flop 504 is coupled to the first multiplexer and a first node N11 for latching the first signal S11. The second flip-flop 506 is coupled to the first node N11 and a second node N12 for latching the second signal S12. The first inverse unit 508 changes the polarity of the second signal S12 and outputs the first feedback signal f11. The first gain stage 510 coupled to the first node N11 obtains the product of the first signal S11 and a first gain and output a first output signal O11. The second gain stage 512 coupled to the second node N12 obtains the product of the second signal S12 and a second gain and outputs a second output signal O12. The first adder 514 coupled to the first gain stage 510, and the second gain stage 512, obtains the sum of the first output signal O11 and the second output signal O12 and outputs the first calculated data 414.

Figure 6:
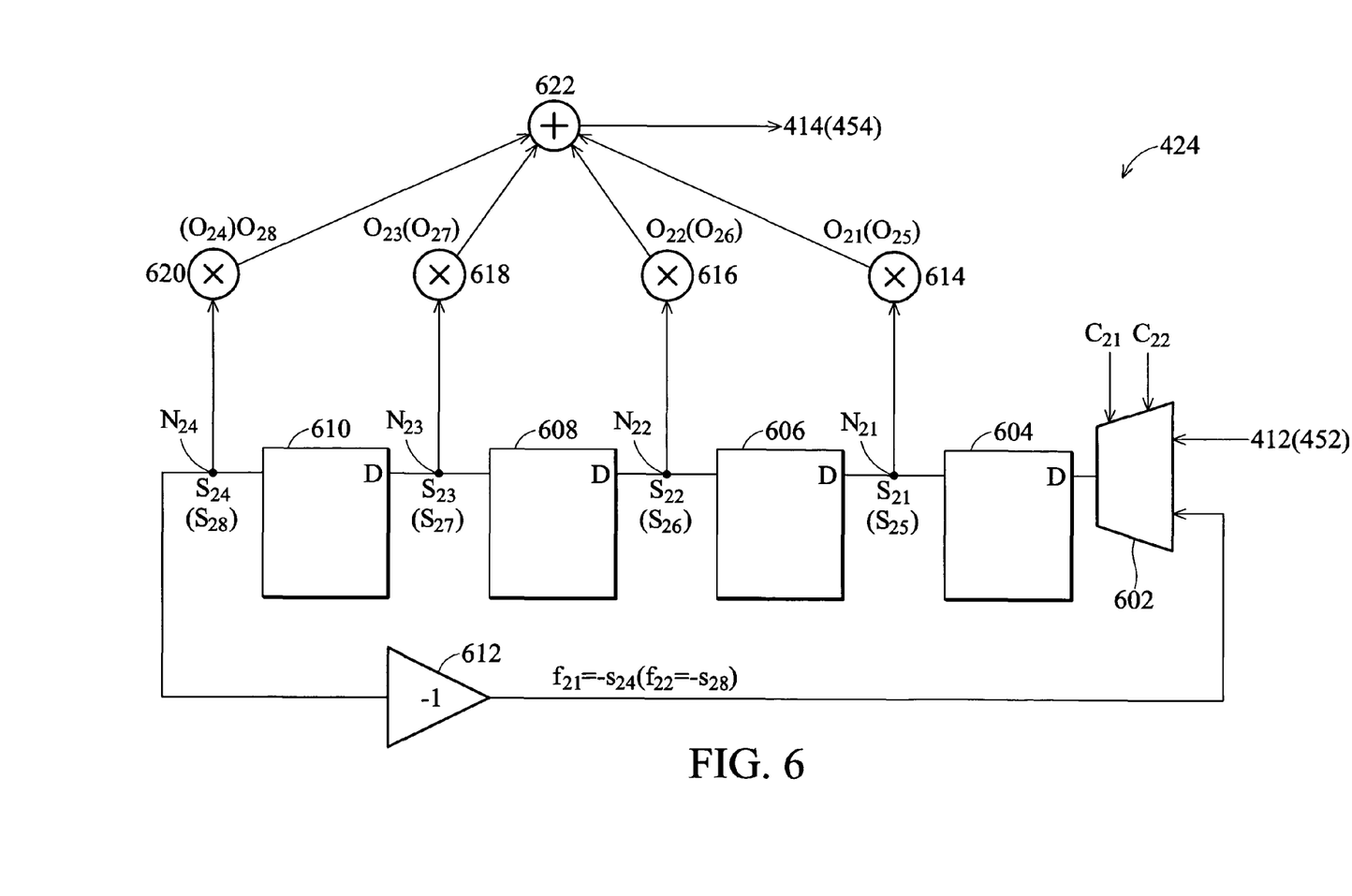
FIG. 6 is a diagram illustrating an exemplary embodiment of a second calculating component.

FIG. 6 is a diagram illustrating an exemplary embodiment of the second calculating component 424. Second calculating component comprises: a second multiplexer 602; a third flip-flop 604; a fourth flip-flop 606; a fifth flip-flop 608; a sixth flip-flop 610; a second inverse unit 612; a third gain stage 614; a fourth gain stage 616; a fifth gain stage 618; a sixth gain stage 620 and a second adder 622.

During the DCT calculation, the second multiplexer 602 in the second calculating unit 424 selects either the pre-processed image data 412 or a third feedback signal f21 for output according to a third selection signal C21 and then generates a fifth signal S21, a sixth signal S22, a seventh signal S23 and an eighth signal S24. The third flip-flop 604 is coupled to the second multiplexer 602 and a third node N21 for latching the fifth signal S21. The fourth flip-flop 606 is coupled to the third node N21 and a fourth node N22 for latching the sixth signal S22. The fifth flip-flop 608 is coupled to the fourth node N22 and a fifth node N23 for latching the seventh signal S23. The sixth flip-flop 610 is coupled to the fifth node N23 and a sixth node N24 for latching the eighth signal S24. The second inverse unit 612 changes the polarity of the eighth signal S24 and outputs the third feedback signal f21. The third gain stage 614 coupled to the third node N21 obtains the product of the fifth signal S21 and a third gain and outputs a fifth output signal O21. The fourth gain stage 616 coupled to the fourth node N22 obtains the product of the sixth signal S22 and a fourth gain and outputs a sixth output signal O22. The fifth gain stage 618 coupled to the fifth node N23 obtains the product of the seventh signal S23 and a fifth gain and outputs a seventh output signal O23. The sixth gain stage 620 coupled to the sixth node N24 obtains the product of the eighth signal S24 and a sixth gain and outputs an eighth output signal O24. The second adder coupled to the third gain stage 614, the fourth gain stage 616, the fifth gain stage 618 and the sixth gain stage 620 obtains the sum of the fifth output signal O21, the sixth output signal O22, the seventh output signal O23 and the eighth output signal O24, and outputs the second calculated data 414.

Figure 4B:
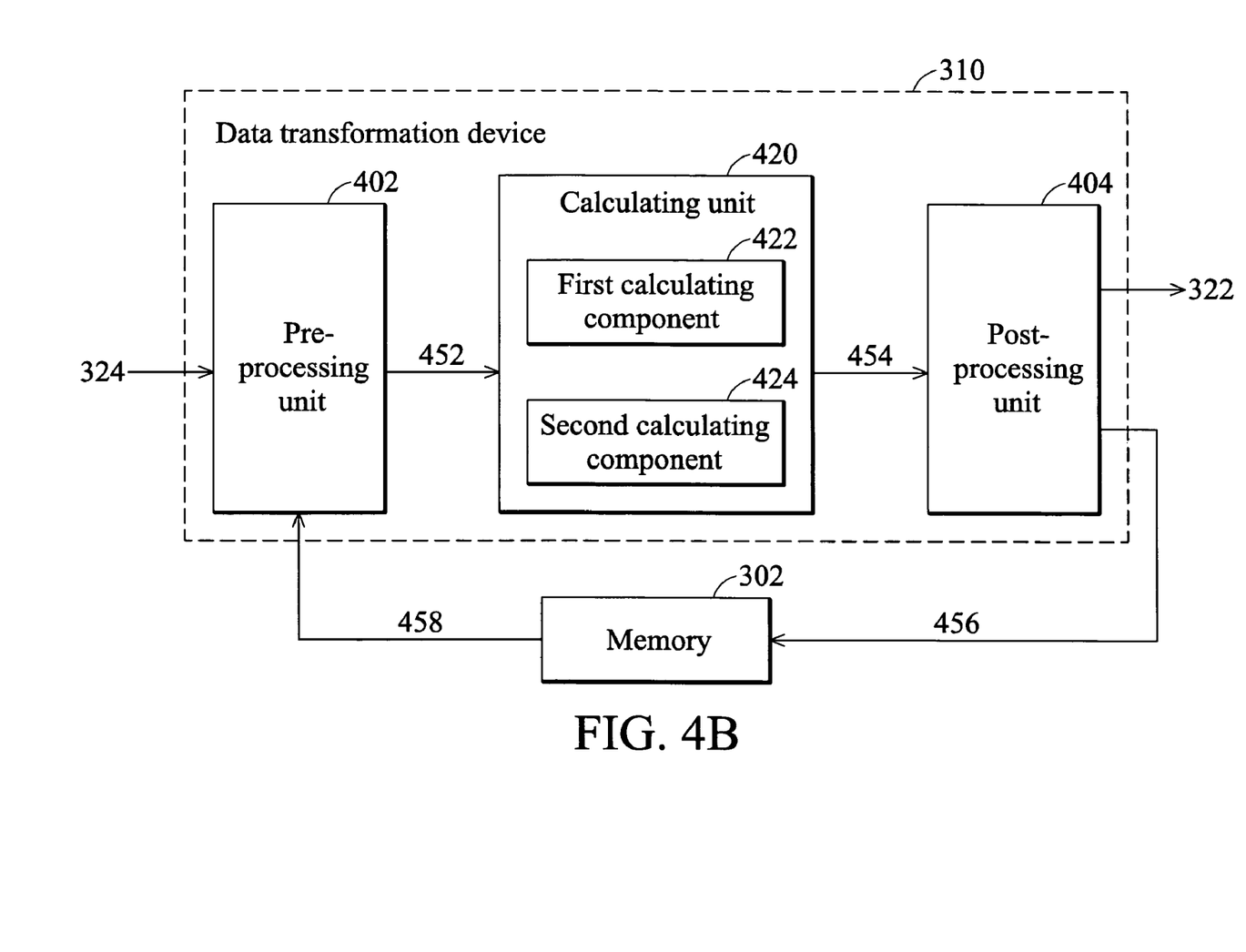
FIG. 4B is a diagram illustrating an exemplary embodiment of a data transformation device.

FIG. 4B is an exemplary embodiment of IDCT calculation by the data transformation system 300. The pre-processing unit 402 performs a second pre-process to generate pre-processed result data 452 according to each row result data in the 2-dimensional result data 324. The second pre-process may re-sort all the row result data or perform additions and subtractions with the all the row result data in the 2-dimensional result data 324. The calculating unit 420 generates second calculated data 454, respectively, by both the first calculating component 422 and the second calculating component 424 according to the pre-processed result data 452. The first calculating component 422 and the second calculating component 424 both are skew circular convolution (SCC) units for performing skew circular convolution with the pre-processed result data 452. The post-processing unit 404 performs a second post-process to generate row image data 456 according to the second calculated data 454 and applies the row image data 456 stored in the memory 302. The second post-process may perform additions and subtractions with the second calculated data 454. Further, in an exemplary embodiment of the invention, the memory 302 may be a transposition random access memory (RAM).

After each row result data in the 2-dimensional result data 324 is processed by the data transformation device 310 to generate the row image data 456, column result data 458 of all the row image data 456 stored in the memory 302 are transmitted to the pre-processing unit 402.

The pre-processing unit 402 performs the second pre-process to generate the pre-processed result data 452 according to the column result data 458. The calculating unit 420 generates the second calculated data 454, respectively, by both the first calculating component 422 and the second calculating component 424 according to the pre-processed result data 452. The post-processing unit 404 performs the second post-process to generate the 2-dimensional image data 322 according to the second calculated data 454, the IDCT calculation is then complete.

According to FIG. 5, during the IDCT calculation, the first multiplexer 502 in the first calculating component 422 selects either the pre-processed result data 452 or a second feedback signal f12 for output according to a second selection signal C12 and then generates a third signal S13 and a fourth signal S14. The first flip-flop 504 latches the third signal S13. The second flip-flop 506 latches the fourth signal S14. The first inverse unit 508 changes the polarity of the fourth signal S14 and outputs the second feedback signal f12. The first gain stage 510 obtains the product of the third signal S13 and the first gain and outputs a third output signal O13. The second gain stage 512 obtains the product of the fourth signal S14 and the second gain and outputs a fourth output signal O14. The first adder 514 obtains the sum of the third output signal O13 and the fourth output signal O14 and outputs the second calculated data 454.

According to FIG. 6, during the IDCT calculation, the second multiplexer 602 in the second calculating component 424 selects either the pre-processing result data 452 or a fourth feedback signal f22 for output according to a fourth selection signal C22 and then generates a ninth signal S25, a tenth signal S26, an eleventh signal S27 and a twelfth signal S28. The third flip-flop 604 latches the ninth signal S25. The fourth flip-flop 606 latches the tenth signal S26. The fifth flip-flop 608 latches the eleventh signal S27. The sixth flip-flop 610 latches the twelfth signal S28. The second inverse unit 612 changes the polarity of the twelfth signal S28 and outputs the fourth feedback signal f22. The third gain stage 614 obtains the product of the ninth signal S25 and the third gain and outputs a ninth output signal O25. The fourth gain stage 616 obtains the product of the tenth signal S26 and the fourth gain and outputs a tenth output signal O26. The fifth gain stage 618 obtains the product of the eleventh signal S27 and the fifth gain and outputs an eleventh output signal O27. The sixth gain stage 620 obtains the product of the twelfth signal S28 and the sixth gain and outputs a twelfth output signal O28. The second adder 622 obtains the sum of the ninth output signal O25, the tenth output signal O26, the eleventh output 027 and the twelfth output signal O28 and outputs the second calculated data 454.

A DCT calculation with four inputs is given as an example in the exemplary embodiment. The DCT transform formulas shown in the following:

$$\overline{X}(0) = \frac{1}{\sqrt{N}} \sum_{n=0}^{N-1} x(n)$$

$$\overline{X}(k) = \sqrt{\frac{2}{N}} \sum_{n=0}^{N-1} x(n)\cos\left(\frac{\pi(2n+1)k}{2N}\right)$$

$$k = 1, 2, \ldots, N-1.$$

Let N=4, and obtain the following formulas:

$$\overline{X}(0) = \frac{1}{2}[x0 + x1 + x2 + x3]$$

$$\overline{X}(1) = \frac{1}{\sqrt{2}}\left[x0\cos\left(\frac{\pi}{8}\right) + x1\cos\left(\frac{3\pi}{8}\right) + x2\cos\left(\frac{5\pi}{8}\right) + x3\cos\left(\frac{7\pi}{8}\right)\right]$$

$$\overline{X}(2) = \frac{1}{\sqrt{2}}\left[x0\cos\left(\frac{2\pi}{8}\right) + x1\cos\left(\frac{6\pi}{8}\right) + x2\cos\left(\frac{10\pi}{8}\right) + x3\cos\left(\frac{14\pi}{8}\right)\right]$$

$$\overline{X}(3) = \frac{1}{\sqrt{2}}\left[x0\cos\left(\frac{3\pi}{8}\right) + x1\cos\left(\frac{9\pi}{8}\right) + x2\cos\left(\frac{15\pi}{8}\right) + x3\cos\left(\frac{21\pi}{8}\right)\right].$$

According to the property that $\cos(x) = -\cos(\pi-x)$, $\overline{X}(0)$, $\overline{X}(1), \overline{X}(2), \overline{X}(3)$ can be simplified as the following:

$$\overline{X}(0) = \frac{1}{2}[(x0 + x3) + (x1 + x2)]$$

$$\overline{X}(1) = \frac{1}{\sqrt{2}}\left[\cos\left(\frac{\pi}{8}\right)(x0 - x3) + \cos\left(\frac{3\pi}{8}\right)(x1 - x2)\right]$$

$$\overline{X}(2) = \frac{1}{\sqrt{2}}\cos\left(\frac{2\pi}{8}\right)[(x0 + x3) - (x1 + x2)]$$

$$\overline{X}(3) = \frac{1}{\sqrt{2}}\left[-\cos\left(\frac{\pi}{8}\right)(x1 - x2) + \cos\left(\frac{3\pi}{8}\right)(x0 - x3)\right].$$

Let (x0+x3)=e0, (x0−x3)=e1, (x1+x2)=e2, (x1−x2)=e3, $\overline{X}(0), \overline{X}(1), \overline{X}(2), \overline{X}(3)$ can be simplified as the following:

$$\overline{X}(0) = \frac{1}{2}[e0 + e2]$$

$$\overline{X}(2) = \frac{1}{\sqrt{2}}\cos\left(\frac{2\pi}{8}\right)[e0 - e2]$$

$$\overline{X}(1) = \frac{1}{\sqrt{2}}\left[\cos\left(\frac{\pi}{8}\right)e1 + \cos\left(\frac{3\pi}{8}\right)e3\right]$$

$$\overline{X}(3) = \frac{1}{\sqrt{2}}\left[\cos\left(\frac{\pi}{8}\right)(-e3) + \cos\left(\frac{3\pi}{8}\right)e1\right].$$

Thus, the result data $\overline{X}(0), \overline{X}(1), \overline{X}(2), \overline{X}(3)$ may be obtained in the output terminal of the post-processing unit 404 by setting the pre-processed image data 412 as [e3, e1], the first gain as $$\cos\left(\frac{3\pi}{8}\right)$$

and the second gain as $$\cos\left(\frac{\pi}{8}\right).$$

Similarly, the result of the DCT calculation with eight inputs may be obtained by setting the gains in the first calculating component 422 and the second calculating component 424.

The first calculating component 422 and the second calculating component 424 in the calculating unit 420 disclosed by the exemplary embodiments of the invention may perform both the DCT calculation and the IDCT calculation. Thus, because the DCT calculation and the IDCT calculation are jointly performed by the same hardware structure, required chip area is decreased and circuit costs can be reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data transformation device, comprising:
a pre-processing unit configured to perform a first pre-process with received image data to generate a pre-processed image data, and to perform a second pre-process with received result data to generate pre-processed result data;
a calculating unit configured to generate a first calculated data and a second calculated data according to the pre-processed image data and the pre-processed result data, respectively, by a first calculating component and a second calculating component, the first calculating component comprising:
a first multiplexer configured to select either the pre-processed image data or a first feedback signal for output according to a first selection signal and then generate a first signal and a second signal;
a first flip-flop coupled to the first multiplexer for latching the first signal;
a second flip-flop coupled to the first multiplexer for latching the second signal;
a first inverse unit configured to change the polarity of the second signal and output the first feedback signal;
a first gain stage coupled to the first flip-flop for obtaining the product of the first signal and a first gain and outputting a first output signal;
a second gain stage coupled to the second flip-flop for obtaining the product of the second signal and a second gain and outputting a second output signal; and
a first adder coupled to the first and second gain stages for obtaining the sum of the first and second output signals and outputting the first calculated data; and
a post-processing unit configured to perform a first post-process to generate the result data according to the first calculating data, and a second post-process to generate the image data according to the second calculating data;
wherein the first and second calculating components both are skew circular convolution units for performing skew circular convolution.

2. The data transformation device as claimed in claim 1, wherein the image data is frame data or one-dimensional processing data stored in a memory.

3. The data transformation devices as claimed in claim 2, wherein the memory is a transposition random access memory (RAM).

4. The data transformation device as claimed in claim 1, wherein the first pre-process includes re-sorting the image data and performing additions and subtractions with the image data, and the second pre-process includes re-sorting the result data and performing additions and subtractions with the result data.

5. The data transformation device as claimed in claim 1, wherein:
the first multiplexer further selects either the pre-processed result data or a second feedback signal for output according to a second selection signal and then generates a third signal and a fourth signal;
the first flip-flop is configured to latch the third signal;
the second flip-flop is configured to latch the fourth signal;
the first inverse unit is configured to change the polarity of the fourth signal and output the second feedback signal;
the first gain stage is configured to obtain the product of the third signal and the first gain and output a third output signal;
the second gain stage is configured to obtain the product of the fourth signal and the second gain and output a fourth output signal; and
the first adder is configured to obtain the sum of the third output signal and the fourth output signal and to output the second calculated data.

6. The data transformation device as claimed in claim 1, wherein the first post-process includes performing additions and subtractions with the first calculated data, and the second post-process includes performing additions and subtractions with the second calculated data.

7. A data transformation device, comprising:
a pre-processing unit configured to perform a first pre-process with received image data to generate a pre-processed image data, and to perform a second pre-process with received result data to generate pre-processed result data;
a calculating unit configured to generate a first calculated data and a second calculated data according to the pre-processed image data and the pre-processed result data, respectively, by a first calculating component and a second calculating component, the second calculating unit comprising:
a second multiplexer configured to select either the pre-processed image data or a third feedback signal for output according to a third selection signal and then generate a fifth signal, a sixth signal, a seventh signal and an eighth signal;
a third flip-flop coupled to the second multiplexer for latching the fifth signal;
a fourth flip-flop coupled to the third flip-flop for latching the sixth signal;
a fifth flip-flop coupled to the fourth flip-flop for latching the seventh signal;
a sixth flip-flop coupled to the fifth flip-flop for latching the eighth signal;
a second inverse unit configured to change the polarity of the eighth signal and output the third feedback signal;
a third gain stage for obtaining the product of the fifth signal and a third gain and outputting a fifth output signal;
a fourth gain stage for obtaining the product of the sixth signal and a fourth gain and outputting a sixth output signal;
a fifth gain stage for obtaining the product of the seventh signal and a fifth gain and outputting a seventh output signal;
a sixth gain stage for obtaining the product of the eighth signal and a sixth gain and outputting an eighth output signal;
a second adder for obtaining the sum of the third output signal, the fourth output signal, the fifth output signal and the sixth output signal and outputting the second calculated data; and
a post-processing unit configured to perform a first post-process to generate the result data according to the first calculating data, and a second post-process to generate the image data according to the second calculating data;
wherein the first and second calculating components both are skew circular convolution units for performing skew circular convolution.

8. The data transformation device as claimed in claim 7, wherein:

the second multiplexer is configured to select either the pre-processing result data or a fourth feedback signal for output according to a fourth selection signal and then to generate a ninth signal, a tenth signal, an eleventh signal and a twelfth signal;

the third flip-flop is configured to latch the ninth signal;

the fourth flip-flop is configured to latch the tenth signal;

the fifth flip-flop is configured to latch the eleventh signal;

the sixth flip-flop is configured to latch the twelfth signal;

the second inverse unit is configured to change the polarity of the twelfth signal and output the fourth feedback signal;

the third gain stage is configured to obtain the product of the ninth signal and the third gain and output a ninth output signal;

the fourth gain stage is configured to obtain the product of the tenth signal and the fourth gain and output a tenth output signal;

the fifth gain stage is configured to obtain the product of the eleventh signal and the fifth gain and output a eleventh output signal;

the sixth gain stage is configured to obtain the product of the twelfth signal and the sixth gain and output a twelfth output signal; and the second adder is coupled to the third gain stage, the fourth gain stage, the fifth gain stage and the sixth gain stage for obtaining the sum of the ninth output signal, the tenth output, the eleventh output and the twelfth output signal and outputting the second calculated data.

* * * * *